US012609388B2

(12) United States Patent
Zhou et al.

(10) Patent No.: US 12,609,388 B2
(45) Date of Patent: Apr. 21, 2026

(54) BATTERY PACK

(71) Applicant: Ningde Amperex Technology Limited, Ningde (CN)

(72) Inventors: Jinbing Zhou, Dongguan (CN); Xin Wang, Dongguan (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 932 days.

(21) Appl. No.: 17/864,922

(22) Filed: Jul. 14, 2022

(65) Prior Publication Data

US 2022/0376335 A1     Nov. 24, 2022

Related U.S. Application Data

(63) Continuation of application No. PCT/CN2021/072342, filed on Jan. 16, 2021.

(30) Foreign Application Priority Data

Jan. 17, 2020     (CN) .......................... 202010054438.3

(51) Int. Cl.
*H01M 50/209* (2021.01)
*H01M 10/42* (2006.01)
(Continued)

(52) U.S. Cl.
CPC ....... *H01M 50/209* (2021.01); *H01M 10/425* (2013.01); *H01M 50/242* (2021.01); *H01M 50/298* (2021.01); *H01M 2010/4271* (2013.01)

(58) Field of Classification Search
None
See application file for complete search history.

(56) References Cited

U.S. PATENT DOCUMENTS

2016/0149180 A1*  5/2016  Tokoo ................. H01M 10/613
                                                      429/154
2018/0351142 A1*  12/2018  Aoki ................... H01M 50/291

FOREIGN PATENT DOCUMENTS

CN          203596376 U       5/2014
CN          106058112 A      10/2016
(Continued)

OTHER PUBLICATIONS

Decision to Grant a Patent issued on Sep. 5, 2023, in corresponding Japanese Application No. 2021-557736, 5 pages.
(Continued)

*Primary Examiner* — Wyatt P McConnell
(74) *Attorney, Agent, or Firm* — Maier & Maier, PLLC

(57) ABSTRACT

A battery cell module includes a plurality of battery cells stacked in a first direction, and a first groove extending in the first direction is formed at each of two ends of the first side of the battery cell module. In a second direction, the two first side covers are arranged at two opposite sides of the battery cell module. First bodies of the two first side covers are substantially parallel to a third direction of the battery cell module, and each of the first side covers is provided with an abutting part. The abutting part extends from an edge of the first side cover and is substantially perpendicular to the first body and is connected to a groove wall of the first groove. The two second side covers and the two first side covers are fastened to each other. The abutting part is inserted into the first groove.

18 Claims, 10 Drawing Sheets

(51) Int. Cl.
　　 *H01M 50/242* 　　　 (2021.01)
　　 *H01M 50/298* 　　　 (2021.01)

(56) References Cited

FOREIGN PATENT DOCUMENTS

| | | | |
|---|---|---|---|
| CN | 206194816 | U | 5/2017 |
| CN | 108539083 | A | 9/2018 |
| CN | 208423016 | U | 1/2019 |
| CN | 109888143 | A | 6/2019 |
| CN | 209104213 | U | 7/2019 |
| KR | 1020160049863 | A | 5/2016 |
| WO | 2014125807 | A1 | 8/2014 |
| WO | 2016093539 | A1 | 6/2016 |
| WO | 2019098491 | A1 | 5/2019 |

OTHER PUBLICATIONS

Office Action issued on Mar. 7, 2023, in corresponding Japanese Application No. 2021-557736, 4 pages.
Office Action issued on Nov. 1, 2022, in corresponding Japanese Application No. 2021-557736, 6 pages.
Examination Report issued on Jun. 6, 2023, in corresponding Australian Application No. 2021208147, 4 pages.
International Search Report and Written Opinion issued on Mar. 26, 2021, in corresponding International Application No. PCT/CN2021/072342; 8 pages (with English Translation).
Extended European Search Report issued on Jun. 18, 2024, in corresponding European Application No. 21741597.5, 3 pages.

\* cited by examiner

BATTERY PACK

CROSS REFERENCE TO THE RELATED APPLICATIONS

The present application is a Bypass Continuation of International Application No. PCT/CN2021/072342, filed on 16 Jan. 2021, the disclosure of which is hereby incorporated by reference in its entirety.

TECHNICAL FIELD

This application relates to the field of power supply, and specifically, to a battery pack.

BACKGROUND

A traditional battery housing includes a cover and a shell with an opening at one end. The shell is provided with a cavity for accommodating battery cells or battery cell modules. The opening of the shell is closed so that the battery housing integrally encloses the battery cell module. The battery housing requires a highly accurate shell to ensure that the battery cell module can enter the cavity from the opening. Any jam may cause the shell to be scrapped. Another battery housing in the prior art uses six side covers to enclose a battery cell module, where the side covers and the battery cell module are fixedly connected by using fasteners, so that the battery housing and the battery cell module are relatively fixed. Such battery housing is not easy to install, leading to undesirable installation efficiency.

SUMMARY

In view of this, it is necessary to provide a battery pack with ease of installing a battery cell module.

A battery pack includes a battery cell module, two first side covers, and two second side covers. The battery cell module includes a plurality of battery cells stacked in a first direction, and a first groove extending in the first direction is formed at each of two ends of a first side of the battery cell module. In a second direction, the two first side covers are arranged at two opposite sides of the battery cell module. First bodies of the two first side covers are substantially parallel to a third direction of the battery cell module. Each of the first side covers is provided with an abutting part, where the abutting part extends from an edge of the first side cover and is substantially perpendicular to the first body of the first side cover, and the abutting part is connected to a groove wall of the first groove of the battery cell module. The second direction is perpendicular to the third direction, and the first direction is perpendicular to both the second direction and the third direction. In the third direction, the two second side covers are arranged at two opposite sides of the battery cell module, the two second side covers are substantially parallel to the second direction, and the two second side covers and the two first side covers are fastened to each other.

According to some embodiments of this application, the battery cell module includes a plurality of battery cell frames for accommodating the plurality of battery cells, where the plurality of battery cell frames form one first groove extending in the second direction at each of the two ends of the first side of the battery cell module.

According to some embodiments of this application, the abutting part includes a first abutting surface and a second abutting surface intersecting with the first abutting surface, where the first abutting surface butts up against the groove wall of the first groove, and the second abutting surface butts up against the groove wall of the first groove.

According to some embodiments of this application, a protrusion protruding toward the battery cell module is provided at intersection of the abutting part and the first body.

According to some embodiments of this application, the protrusion is provided with a groove for weight reduction.

According to some embodiments of this application, the battery pack further includes a first end cover and a second end cover, where the first end cover and the second end cover are respectively located on two opposite sides of the battery cell module and respectively connected to the two second side covers.

According to some embodiments of this application, the battery pack further includes at least two cushions, where at least one of the cushions is located between the first end cover and the battery cell module, and the first end cover is connected to the first side cover and presses the cushion onto the battery cell module. At least one of the cushions is located between the second end cover and the battery cell module, and the second end cover is connected to the first side cover and presses the cushion onto the battery cell module.

According to some embodiments of this application, the first end cover is provided with a first butting surface for butting up against the cushion, the second end cover is provided with a second butting surface for butting up against the cushion, and a distance H between the first butting surface and the second butting surface satisfies: $H = h - \varepsilon_1 - \varepsilon_2$; where h is a sum of a height of the battery cell module and a total height of all cushions located between the first end cover and the second end cover in natural state, and $\varepsilon_1$ is a total deformation of the plurality of battery cells in the battery cell module, obtained through life test; and the first end cover and the second end cover each apply pressure to the corresponding cushion in the stacking direction of the battery cells in the battery cell module, so that the cushions deform under the pressure; where $\varepsilon_2$ is a total deformation of all cushions between the first end cover and the second end cover, obtained through the life test.

According to some embodiments of this application, the second side cover includes a second body and sliding parts respectively arranged at two ends of the second body. The first side cover is provided with sliding grooves penetrating two ends of the first side cover, the two sliding parts respectively slide into the sliding grooves on the two first side covers, and movement of the sliding part in a plane perpendicular to a sliding direction is stopped by a groove wall of the sliding groove.

According to some embodiments of this application, the sliding groove includes a first stop surface, a second stop surface, and a third stop surface that are sequentially connected, where the first stop surface and the third stop surface are respectively located on two opposite sides of the sliding part, and the second stop surface is located on a side of the sliding part back away from the second body.

According to some embodiments of this application, the sliding part includes an adapting part and a positioning part. One end of the adapting part is arranged at the second body, and the other end of the adapting part extends toward the second body. One end of the positioning part is arranged at the adapting part, and the other end of the positioning part extends toward a side of the adapting part back away from the second body. Movement of the positioning part is stopped by the first stop surface, the second stop surface, and the third stop surface. The sliding groove further includes a fourth stop surface and a fifth stop surface that connected to the fourth stop surface, where the fourth stop surface is opposite to the second stop surface and is configured to stop a side of the positioning part back away from the second stop surface, and the fifth stop surface is configured to stop the second body.

According to some embodiments of this application, the two opposite sides of the second body respectively butt up against the first end cover and the second end cover.

According to some embodiments of this application, the first side cover is provided with a first connecting hole, and the first end cover and the second end cover are each provided with a first mounting hole aligned with the connecting hole, and a first fastener runs through the first mounting hole and is threadedly connected to the first connecting hole, so that the first end cover and the second end cover are both fastened to the first side cover.

According to some embodiments of this application, the first end cover and the second end cover are each provided with a stiffener for increasing strength, where a mounting surface, on the peripheral side of the first mounting hole, for mounting the first fastener is lower than a top surface of the stiffener.

According to some embodiments of this application, the battery pack further includes a protective cover. A side of the first end cover back away from the second end cover is used for installing a battery management system. The protective cover covers the battery management system, the first side cover is provided with a second connecting hole, the first end cover is provided with a via hole aligned with the second connecting hole, the protective cover is provided with a second mounting hole, and a second fastener runs through the second mounting hole and the via hole in sequence and is threadedly connected to the second connecting hole, so that the protective cover, the first end cover, and the first side cover are relatively fastened.

According to some embodiments of this application, the first end cover is provided with a first through hole, a partitioning part is provided in the first through hole, and the partitioning part partitions the first through hole into a first hole and a second hole that are separated. The first hole and the second hole each allow a plurality of wiring harnesses of the battery cell module and the battery management system to pass through, for distribution of wiring harnesses.

According to some embodiments of this application, a plurality of threaded holes and a plurality of unthreaded holes are symmetrically arranged in the first end cover at a plurality of different positions, where the threaded hole is used to install the battery management system, and the unthreaded hole is used to fasten the wired wiring harness.

According to some embodiments of this application, a plurality of electronic components are provided in the battery management system, a panel is provided on a side of the protective cover back away from the first end cover, the panel is configured for installing the plurality of electronic components, and the panel is lower than the outermost side of the protective cover farther away from the first end cover.

According to some embodiments of this application, the panel is not lower than a power button back away from the outermost side of the first end cover.

According to some embodiments of this application, the protective cover is provided with a handle for portability, and the protective cover is formed with the handle as a whole through die-casting.

According to some embodiments of this application, the second end cover is provided with a plurality of second through holes, and a heat dissipation structure is installed on a side of the first end cover back away from the second end cover, the first end cover is provided with a first through hole, and the second through hole and the heat dissipation structure are respectively located at two opposite ends of a diagonal line of the battery cell module.

In the foregoing battery pack, the first side cover is provided with the abutting part, and the abutting part is inserted in the first groove of the battery cell module. The two first side covers are connected to the two second side covers, so that the abutting parts of the two first side covers respectively abut on the two opposite sides of the battery cell module, and the battery cell module is fastened in a space formed by the two first side covers and the two second side covers. This allows for convenient and efficient installation.

Figure 1:
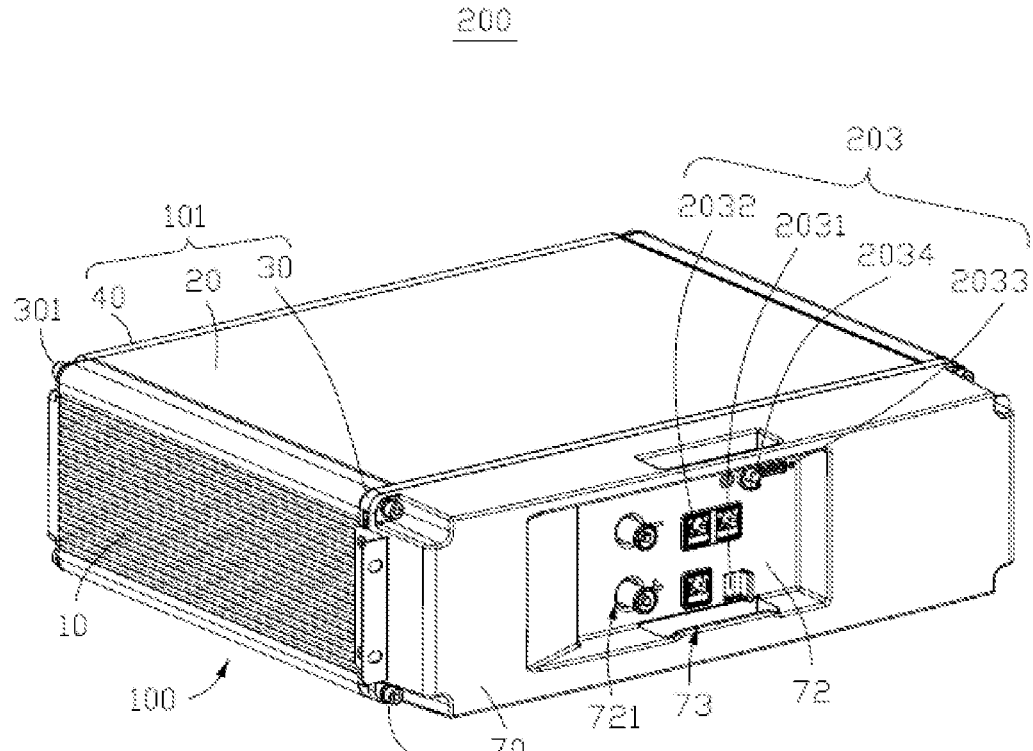
FIG. 1 is a schematic structural diagram of a battery housing according to an embodiment of this application.

Reference signs of main components:

This application will be further described with reference to the accompanying drawings in the following specific embodiments.

DETAILED DESCRIPTION

The following clearly and completely describes the technical solutions in the embodiments of this application with reference to the accompanying drawings in the embodiments of this application. Apparently, the described embodiments are only some rather than all of the embodiments of this application.

Unless otherwise defined, all technical and scientific terms used herein shall have the same meanings as commonly understood by those skilled in the art to which this application belongs. The terms used herein in the specification of this application are only used to describe specific embodiments, and are not intended to limit this application.

The terms "about", "roughly", "substantially", and "approximately" used herein are intended to describe and represent small variations. When used in combination with an event or a circumstance, the term may refer to an example in which the exact event or circumstance occurs or an example in which an extremely similar event or circumstance occurs. For example, when used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if a difference between two numerical values is less than or equal to ±10% of an average numerical value of the numerical values (for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), the two numerical values may be considered "roughly" the same.

Some embodiments of this application propose a battery pack, including a battery cell module, two first side covers, and two second side covers. The battery cell module includes a plurality of battery cells stacked in a first direction, and a first groove extending in the second direction is formed at each of two ends of a first side of the battery cell module. In a second direction, the two first side covers are arranged at two opposite sides of the battery cell module. First bodies of the two first side covers are substantially parallel to a third direction of the battery cell module, each of the first side covers is provided with an abutting part, the abutting part extends from an edge of the first side cover and is substantially perpendicular to the first body of the first side cover, the abutting part is connected to a groove wall of the first groove of the battery cell module, the second direction is perpendicular to the third direction, and the first direction is perpendicular to both the second direction and the third direction. In the third direction, the two second side covers are arranged at two opposite sides of the battery cell module, the two second side covers are substantially parallel to the second direction, and the two second side covers and the two first side covers are fastened to each other.

In the foregoing battery pack, the first side cover is provided with the abutting part, the abutting part is inserted into the first groove of the battery cell module, and the two first side covers are connected to the two second side covers, so that the abutting parts of the two first side covers respectively abut on the two opposite sides of the battery cell module, and the battery cell module is fastened in the battery housing. This allows for convenient and efficient installation.

The following describes in detail some embodiments of this application with reference to the accompanying drawings. In absence of conflicts, the following embodiments and features in the embodiments may be combined.

Referring to FIG. 1 to FIG. 7, an embodiment of this application provides a battery pack 200. The battery pack 200 includes a battery cell module 201 and a battery housing 100. The battery housing 100 encloses the battery cell module 201 to provide protection. The battery housing 100 includes two first side covers 10 and an enclosure cover 101.

The enclosure cover 101 includes a first end cover 30, a second end cover 40, and two second side covers 20, where the first end cover 30, the second end cover 40, and the two second side covers 20 are connected to form a substantially annular shell structure, so that the battery cell module 201 is enclosed in the enclosure cover 101. The two first side covers 10 are located on two opposite sides of the battery cell module 201. The two second side covers 20 are located on two opposite sides of the battery cell module 201. Each of the first side covers 10 is provided with an abutting part 11. The abutting part 11 is configured to be inserted into a first groove 2012 on the battery cell module 201 and abut on the battery cell module 201. Specifically, the battery cell module 201 includes battery cell frames 2011 and battery cells 2015. The battery cell frame 2011 is configured to fasten the battery cell 2015. A first groove 2012 is provided at each of two ends of the battery cell frame 2011. The two first side covers 10 are respectively connected to two ends of the enclosure cover 101, the enclosure cover 101 and the two first side covers 10 enclose the battery cell module 201, and the battery cell module 201 is fastened in the battery housing 100.

It can be understood that the first end cover 30 and the second end cover 40 are provided to make the entire battery housing 100 form a closed structure to accommodate the battery cell module 201. In other embodiments, if there are two end surfaces in a use environment of the battery pack 200 for installing the battery pack 200, the battery pack 200 itself may not include the first end cover 30 and the second end cover 40.

Figure 2:
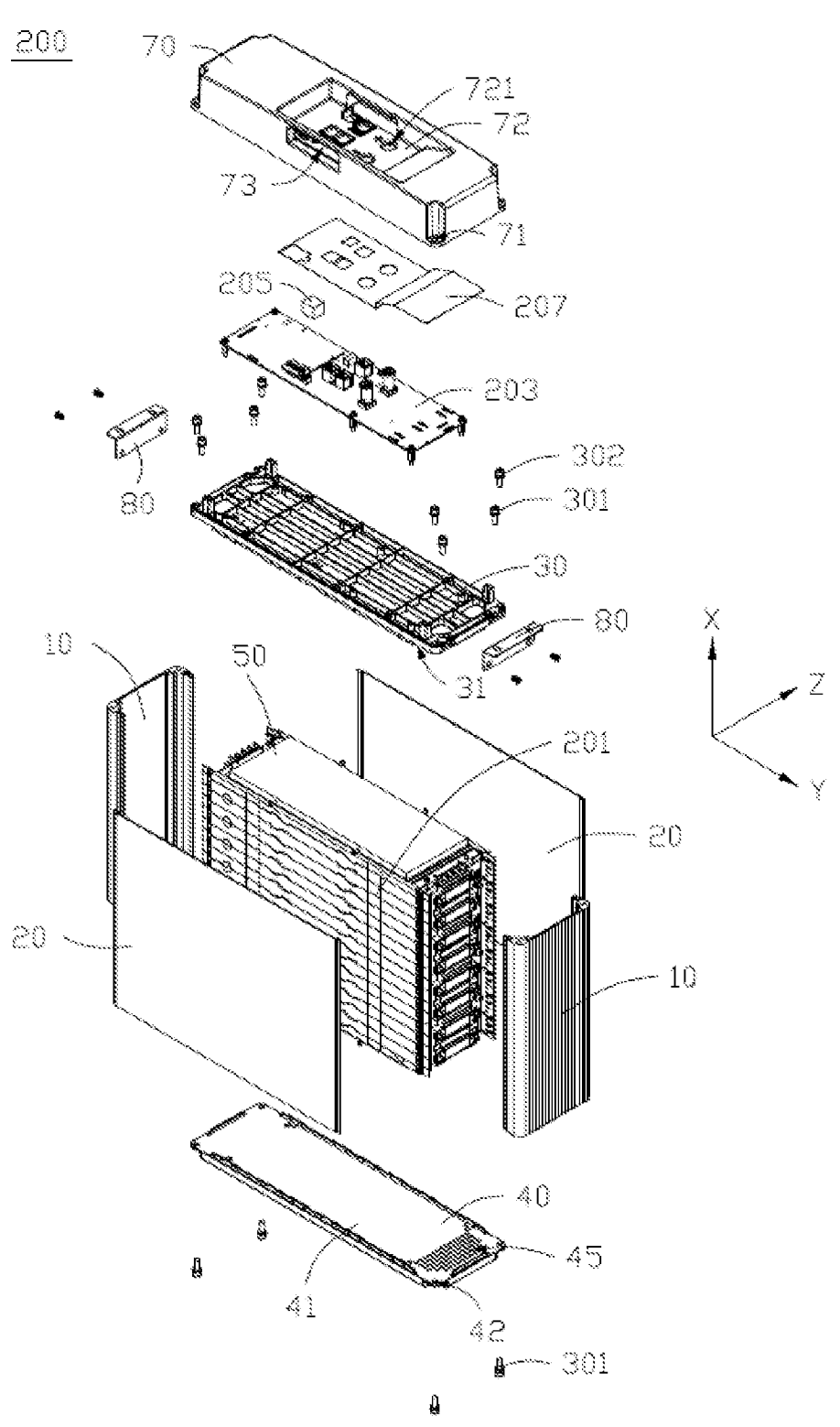
FIG. 2 is a schematic structural exploded view of the battery housing shown in FIG. 1.
Figure 3:
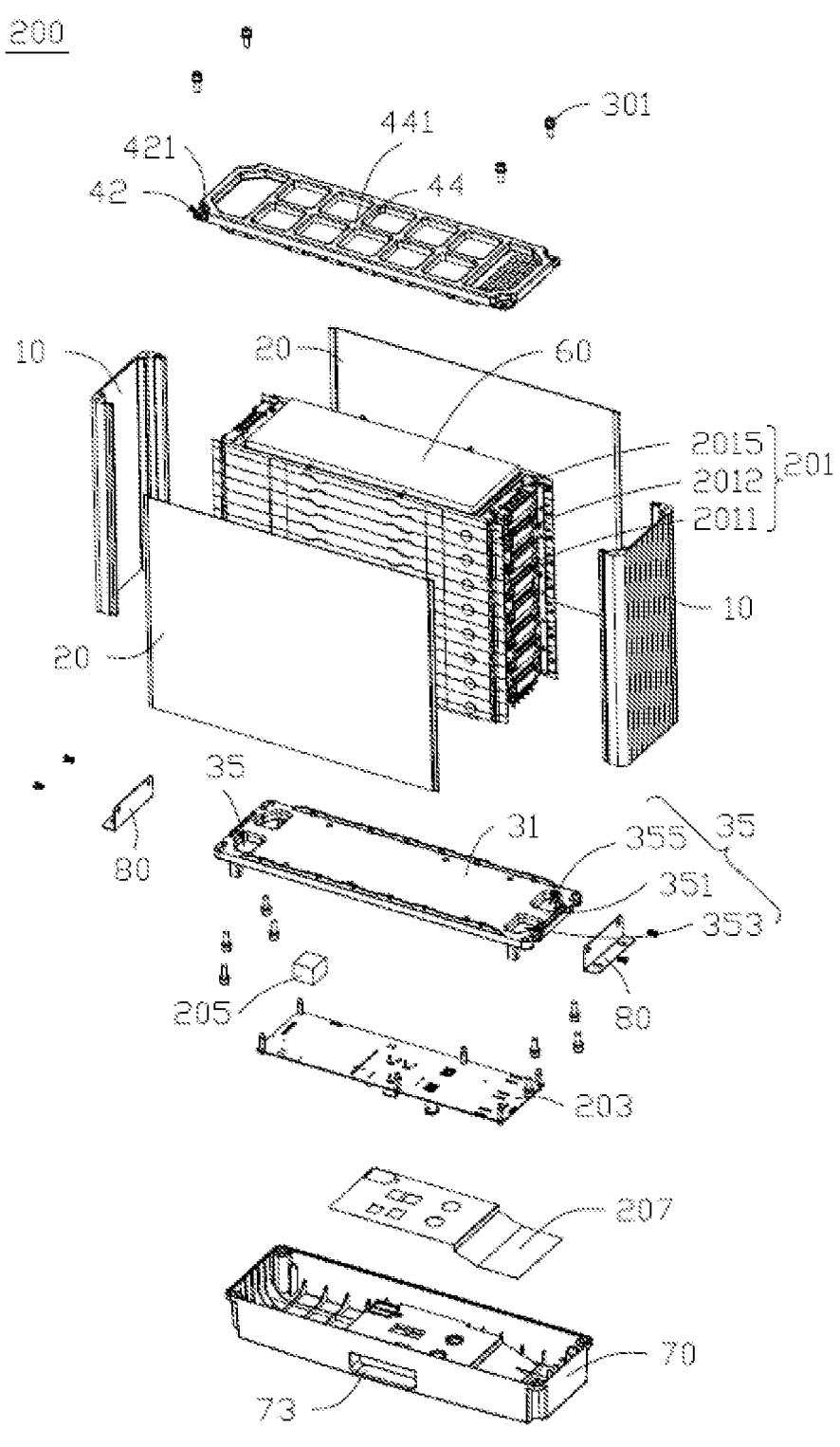
FIG. 3 is a schematic structural exploded view of the battery housing shown in FIG. 2 from another perspective.
Figure 4:
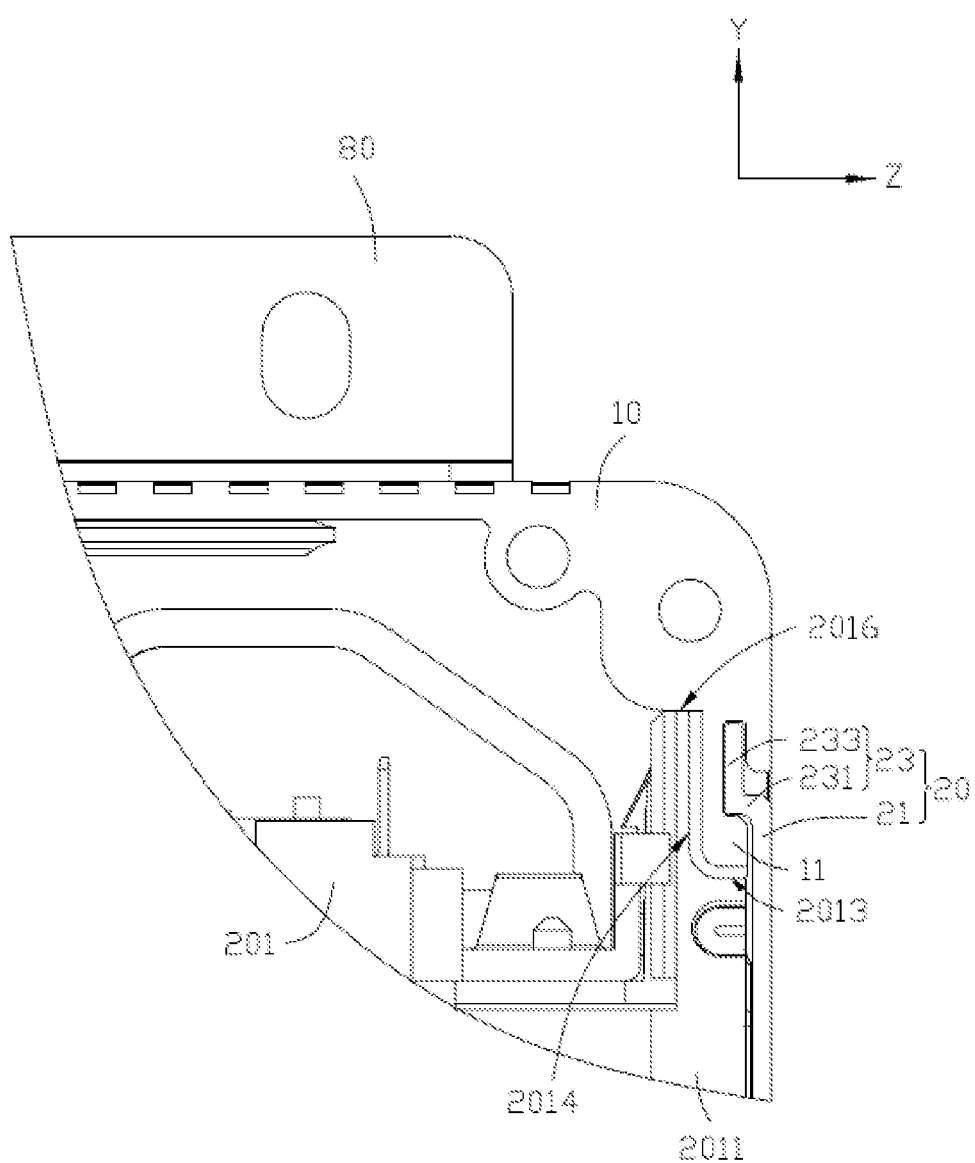
FIG. 4 is a schematic diagram of a partial structure of the battery housing shown in FIG. 1 with a first end cover removed.
Figure 6:
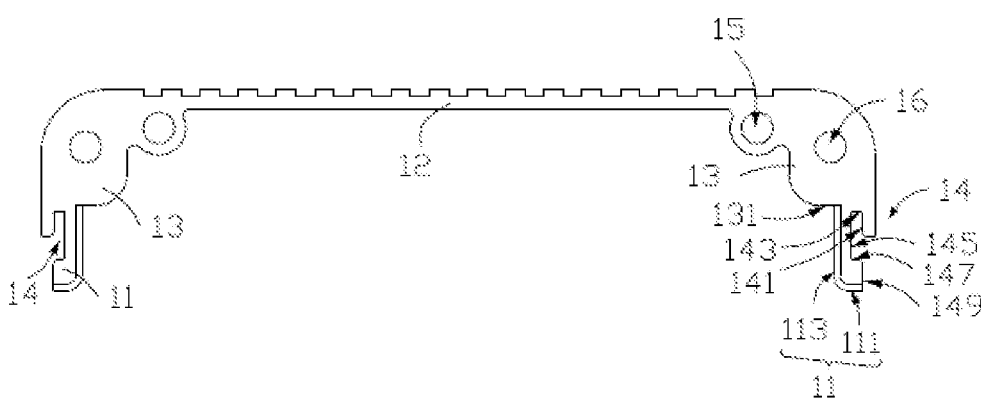
FIG. 6 is a schematic structural diagram of a first side cover of the battery housing shown in FIG. 1.

Referring to FIG. 2, FIG. 4, and FIG. 6, for ease of subsequent description, a first direction X, a second direction Y, and a third direction Z that are perpendicular to each other are defined according to coordinate axes. In the illustrated embodiment, the first direction X is a stacking direction of a plurality of battery cells 2015, that is, an extension direction of the first groove 2012; the second direction Y is a direction in which one first side cover 10 faces the other first side cover 10; and the third direction Z is perpendicular to both the second direction Y and the first direction X.

The first side cover 10 includes a first body 12 and an abutting part 11. The first body 12 is substantially parallel to the third direction Z of the battery cell module 201, which means that the first body 12 may have a small included angle with respect to the third direction Z, but the first body 12 can be approximately parallel to the third direction Z. The abutting parts 11 are respectively provided at two ends of the first body 12 and extend from an edge of the first side cover 10, and an extension direction of the abutting parts 11 is approximately perpendicular to the first body 12 of the first side cover 10. The extended abutting parts 11 are connected to the enclosure cover 101 so that the first body 12 and the battery cell module 201 are separated by a specified distance. The extension direction of the abutting part 11 is substantially perpendicular to the first body 12, but it is not limited thereto. It can be understood that in other embodiments, an included angle between the extension direction of the abutting part 11 and the first body 12 may also be any other angle greater than 0° and less than 180°, provided that the abutting part 11 can abut on the groove wall of the first groove 2012 to fasten the battery cell module 201.

Still referring to FIG. 4 and FIG. 6, the abutting part 11 includes a first abutting surface 111 and a second abutting surface 113 intersecting with the first abutting surface 111. The first abutting surface 111 butts up against the groove wall 2013 of the first groove 2012 so that the battery cell module 201 is positioned in the second direction Y. The second abutting surface 113 butts up against the groove wall 2014 of the first groove 2012 so that the battery cell module 201 is positioned in the third direction Z. When the enclosure cover 101 is connected to the two opposite first side covers 10, interference fit is implemented between the abutting parts 11 and the first grooves 2012, so that the two abutting parts 11 located on the two sides of the battery cell module 201 abut on and fasten the battery cell module 201.

The first side cover 10 protrudes to the inside of the battery housing 100 at intersection of the first body 12 and the abutting part 11 to form a protrusion 13. A third abutting surface 131 is provided on a side of the protrusion 13 facing toward the first abutting surface 111. The third abutting surface 131 is substantially parallel to the first abutting surface 111, but it is not limited thereto. The third abutting surface 131 is configured to abut on a side wall 2016 of the battery cell frame 2011 that is connected to the first groove 2012. It can be understood that in other embodiments, the third abutting surface 131 may alternatively be omitted.

It can be understood that, in other embodiments, the first abutting surface 111, the second abutting surface 113, and the third abutting surface 131 may be set by copying a shape of the battery cell module 201 to abut on the battery cell module 201.

Specifically, the two second side covers 20 are respectively located on two sides of each of the first side covers 10 in the third direction Z. Two ends of each second side cover 20 are respectively connected to the two first side covers 10. The first end cover 30 and the second end cover 40 are respectively located on two opposite sides of the battery cell module 201 and both connected to the two second side covers 10. The first end cover 30 and the second end cover 40 are respectively located on the two sides of the first side cover 10 in the first direction X.

Figure 5:
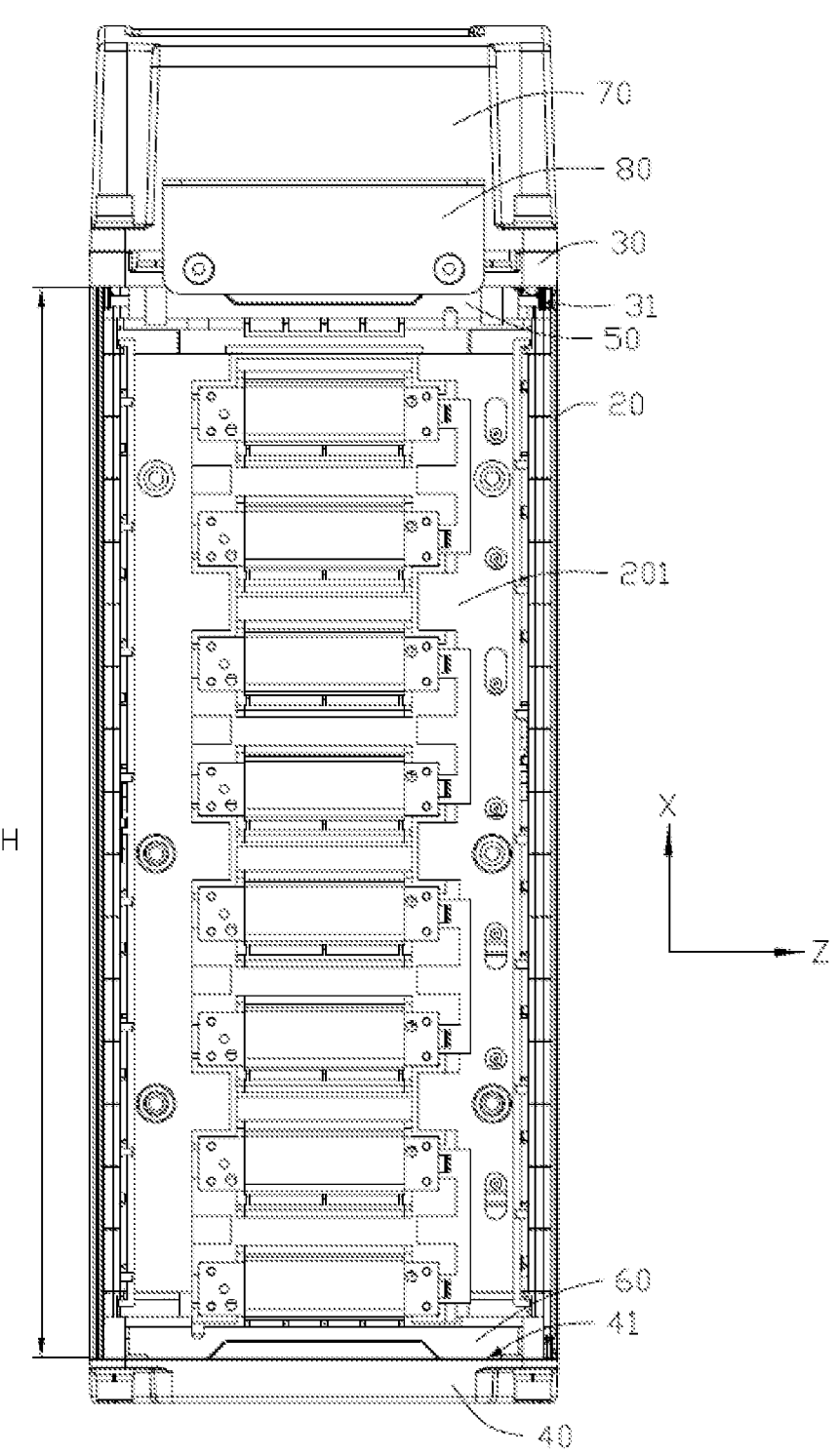
FIG. 5 is a schematic structural diagram of the battery housing shown in FIG. 1 with a first side cover removed.

Still referring to FIG. 5, the battery housing 100 further includes a cushion 50 and a cushion 60. The cushion 50 is located between the first end cover 30 and the battery cell module 201. The first end cover 30 is connected to the first side cover 10 and presses the cushion 50 onto the battery cell module 201. The cushion 60 is located between the second end cover 40 and the battery cell module 201. The second end cover 40 is connected to the first side cover 10 and presses the cushion 60 onto the battery cell module 201.

The cushion 50 and the cushion 60 are made of soft materials such as MPP (a material using modified polypropylene as a primary raw material), CR (chloroprene rubber), flame-retardant silicone rubber, or other rubber.

The cushion 50 and the cushion 60 are respectively arranged at the two sides of the battery cell module 201 in the stacking direction of the battery cells, to avoid a disadvantage of fast heat dissipation on two sides and slow heat dissipation in the middle of the battery cell module 201. The cushion 50 and the cushion 60 are respectively arranged the two sides of the battery cell module 201 in the stacking direction of the battery cells, so that uniform heat dissipation is implemented for the battery cell module 201, an internal temperature difference of the battery cell module 201 is reduced, and life of the battery cell module 201 is prolonged.

It can be understood that, in other embodiments, a quantity of cushions 50 and/or cushions 60 may alternatively be two or other numbers.

The enclosure cover 101 includes the first end cover 30 and the second end cover 40 that are connected, so that the first end cover 30 can apply pressure to the cushion 50 and the battery cell module 201 in the first direction X, and the second end cover 40 can apply pressure to the cushion 60 and the battery cell module 201 in the first direction X. Because the cushion 50 and the cushion 60 can be deformed under pressure, rigid contact that may be caused by process errors can be eliminated.

Uneven swelling of the battery cells 2015 may cause the lack of electrolyte inside or decomposition of the electrolyte. As a result, the battery cells 2015 swell and catch fire, which may cause an explosion. Applying pressure to the battery cells 2015 in the stacking direction of the battery cells 2015 can alleviate swelling caused by lithium intercalation at the anode in a charging process of the battery cell module 201, avoiding irreversible swelling during long-term use. In the prior art, end plates (not shown in the figure) are usually used to cover the two sides of the battery cell module 201, and steel strips (not shown in the figure) are used to tie the two end plates, so as to apply pressure to the battery cell module 201 to reduce swelling of the battery cell module 201. In this application, the first end cover 30 and the second end cover 40 are used to press the cushion 50 and the cushion 60, so as to apply pre-pressure to the battery cell module 201, improve charging and discharging stability of the battery cell module 201, and prolong cycle life of the battery cell module 201. This spares the use of end plates and steel strips for the battery housing 100, thereby reducing costs, facilitating installation, and reducing a size of the battery housing 100 in the first direction X.

Interference fit of the first end cover 30, the second end cover 40, the cushion 50, the cushion 60, and the battery cell module 201 in the first direction X can improve connection stability of the structure and avoid damage caused by, for example, shaking.

The first end cover 30 is provided with a first butting surface 31 for butting up against the cushion 50. The second end cover 40 is provided with a second butting surface 41 for butting up against the cushion 60. A distance H between the first butting surface 31 and the second butting surface 41 satisfies: $H = h - \varepsilon_1 - \varepsilon_2$, where h is a total height of the battery cell module 201, the cushion 50, and the cushion 60 in natural state; $\varepsilon_1$ is a total deformation of the battery cell module 201, obtained through life test; and $\varepsilon_2$ is a total deformation of the cushions 50 and the cushions 60 between the first end cover 30 and the second end cover 40, obtained through life test.

Specifically, according to cycle life test of the battery cells 2015, a life-pre-pressure curve of the battery cells 2015 can be obtained, and the peak of the curve is the optimal initial pre-pressure of the battery cells 2015. A deformation quantity $\varepsilon_{11}$ corresponding to the battery cells 2015 is obtained through calculation or test based on the initial pre-pressure. The battery cell module 201 includes n battery cells 2015, then $\varepsilon_1 = n \times \varepsilon_{11}$. A deformation quantity $\varepsilon_{21}$ of the cushion 50 is obtained through calculation or test based on the pre-pressure. A deformation quantity $\varepsilon_{22}$ of the cushion 60 is obtained through calculation or test based on the pre-pressure. $\varepsilon_2 = \varepsilon_{21} + \varepsilon_{22}$. A height of the battery cell module 201 in natural state is $h_1$, a height of the cushion 50 in natural state is $h_{21}$, a height of the cushion 60 in natural state is $h_{22}$, then $h = h_1 + h_{21} + h_{22}$. The distance H between the first butting surface 31 and the second butting surface 41 satisfies: $H = h_1 + h_{21} + h_{22} - n \times \varepsilon_{11} - \varepsilon_{21} - \varepsilon_{22}$.

It can be understood that, in other embodiments, a height of the cushion 50 may be the same as that of the cushion 60.

The deformation quantity $\varepsilon_{11}$, the deformation quantity $\varepsilon_{21}$, and the deformation quantity $\varepsilon_{22}$ are peak values taken from the life-pre-pressure curve obtained through the cycle life test, where the peak values may approximate a range of values on a smooth straight line in the curve. Therefore, the deformation quantity $\varepsilon_{11}$, the deformation quantity $\varepsilon_{21}$, and the deformation quantity $\varepsilon_{22}$ are numerical values obtained within the numerical range corresponding to the peak value. Accordingly, the distance H between the first butting surface 31 and the second butting surface 41 may be a value in the numerical range based on the deformation quantity $\varepsilon_{11}$, the deformation quantity $\varepsilon_{21}$, and the deformation quantity $\varepsilon_{22}$.

Figure 8:
FIG. 8 is a schematic structural diagram of a second side cover of the battery housing shown in FIG. 1.
Figure 8:
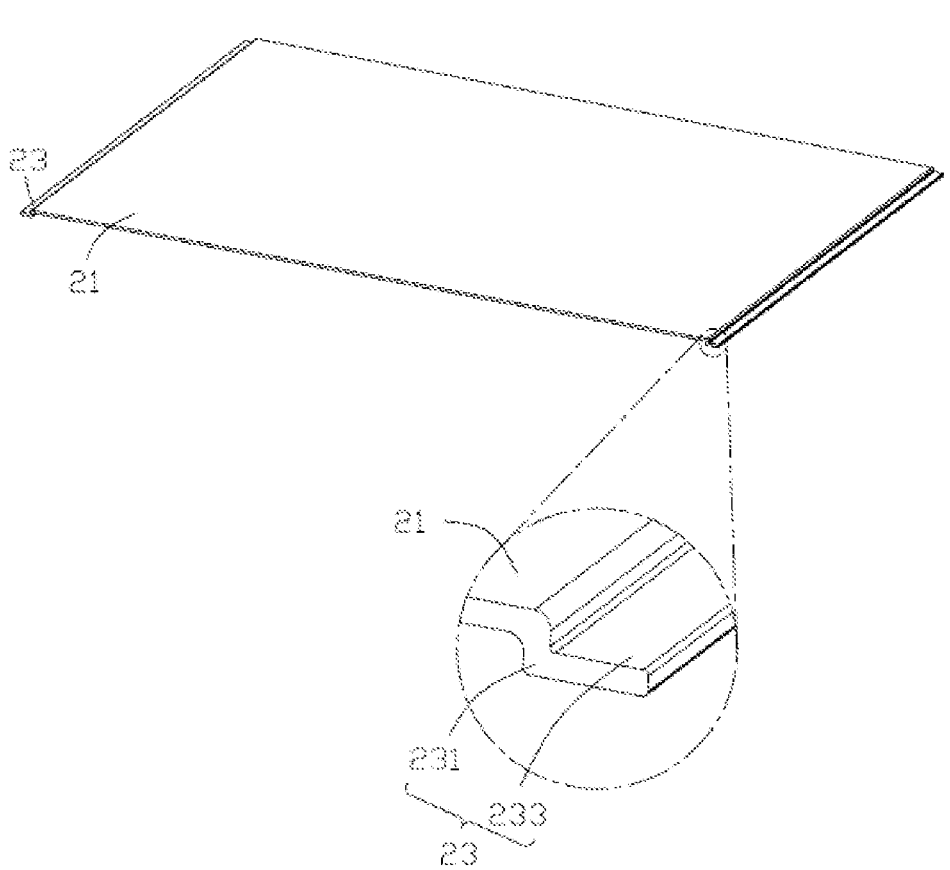

Referring to FIG. 4, FIG. 6, and FIG. 8, the second side cover 20 includes a second body 21 and sliding parts 23 respectively arranged at two ends of the second body 21. A sliding groove 14 is provided on each of two sides of the first side cover 10. The sliding groove 14 penetrates the first side cover 10 in the first direction X. The sliding groove 14 is provided on the abutting part 11, but is not limited thereto. For example, in other embodiments, the sliding groove 14 may alternatively be arranged at the protrusion 13. The two sliding parts 23 of the second side cover 20 slide into the corresponding sliding grooves 14 on the two first side covers 10 respectively. Movement of the sliding part 23 in a plane perpendicular to a sliding direction is stopped by groove walls of the sliding groove 14, that is, when moving in the second direction Y and the third direction Z, the sliding part 23 is stopped by the groove walls of the sliding groove 14. The sliding part 23 and the sliding groove 14 are interference fitted, so that the second side cover 20 and the first side cover 10 are relatively fixedly connected.

It can be understood that, in other embodiments, the sliding part 23 and the sliding groove 14 may be clearance fitted, so that the sliding part 23 of the second side cover 20 easily slides into the sliding groove 14, and the first end cover 30 and the second end cover 40 respectively abut on the two second side covers 20 to fasten the second side cover 20 relative to the first side cover 10.

Referring to FIG. 6, the sliding groove 14 is substantially an L-shaped groove, but is not limited thereto. Specifically, the sliding groove 14 includes a first stop surface 141, a second stop surface 143, and a third stop surface 145 that are connected in sequence. The first stop surface 141 and the third stop surface 145 are configured to abut on two opposite sides of the sliding part 23 respectively. The second stop surface 143 is configured to abut on a side of the sliding part 23 back away from the second body 21.

The sliding part 23 includes an adapting part 231 and a positioning part 233. One end of the adapting part 231 is arranged at the second body 21, and the other end extends toward the battery cell module 201. One end of the positioning part 233 is arranged at the adapting part 231, and the other end extends toward a side of the adapting part 231 back away from the second body 21. The positioning part 233 separately butts up against the first stop surface 141, the second stop surface 143, and the third stop surface 145. The sliding groove 14 further includes a fourth stop surface 147 and a fifth stop surface 149 connected to the fourth stop surface 147. The fourth stop surface 147 is opposite to the second stop surface 143 and is configured to stop a side of the positioning part 233 back away from the second stop surface 143. The fifth stop surface 149 is configured to stop the second body 21.

It can be understood that, in other embodiments, the second body 21 may alternatively be a flat plate structure, the adapting part 231 may alternatively be omitted, and the positioning part 233 and the second body 21 are coplanar. The sliding groove 14 may alternatively be a U-shaped groove, and the fourth stop surface 147 and the fifth stop surface 149 may alternatively be omitted. The positioning part 233 is inserted into the sliding groove 14 of the U-shaped groove structure, and is stopped by the groove walls of the sliding groove 14 when moving in the second direction Y and the third direction Z.

A first connecting hole 15 is provided on each of two sides of the first side cover 10. The first end cover 30 is provided with four first mounting holes 32, and the second end cover is provided with four first mounting holes 42. Each first mounting hole 32 and each first mounting hole 42 are both aligned with one first connecting hole 15. A first fastener 301 runs through the first mounting hole 32/the first mounting hole 42 and is threadedly connected to the first connecting hole 15, so that the first end cover 30 and the second end cover 40 are both connected and fastened to the first side cover 10. The first fastener 301 is a screw, but is not limited thereto. The first end cover 30 and the second end cover 40 abut on the second side cover 20.

The four first mounting holes 32 are distributed around the first side cover 10, but are not limited thereto. It can be understood that the first mounting holes 32 may alternatively be provided in two, six, or other numbers. For example, the two first mounting holes 32 are distributed at positions in a diagonal line of the first end cover 30.

The first side cover 10 is made by an aluminum extrusion process, and the second side cover 20 is a sheet metal structure, which are not limited thereto. For example, the first side cover 10 and/or the second side cover 20 may alternatively be plastic products made by an injection molding process.

Figure 9:
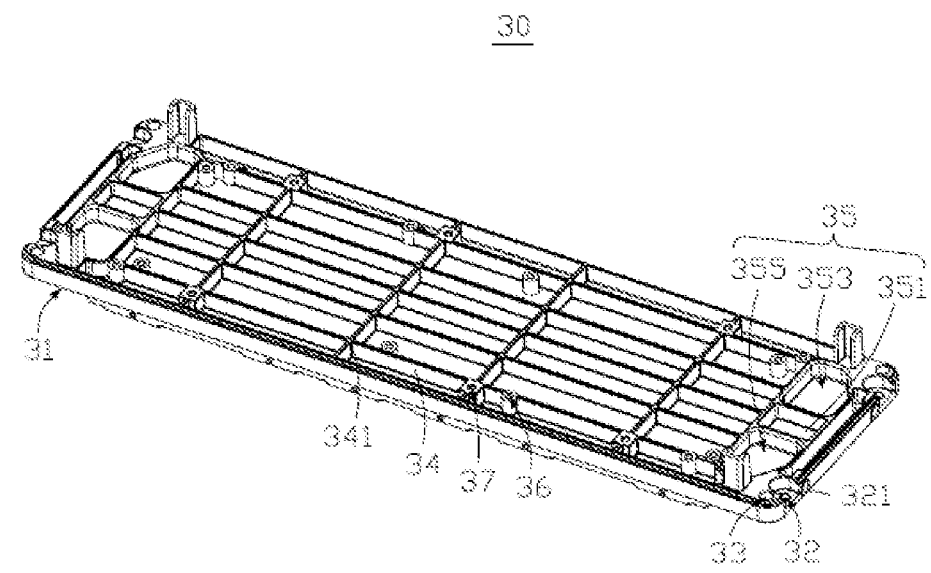
FIG. 9 is a schematic structural diagram of a first end cover of the battery housing shown in FIG. 1.
Figure 10:
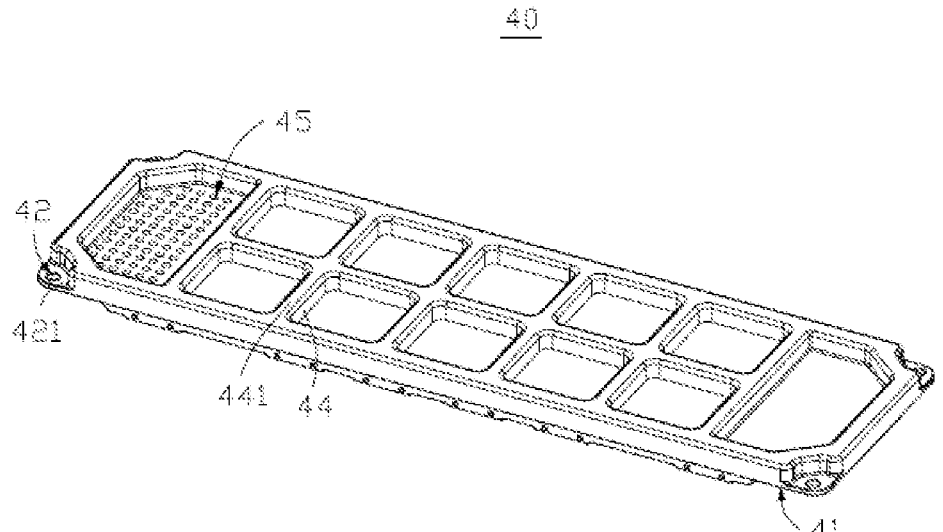
FIG. 10 is a schematic structural diagram of a second end cover of the battery housing shown in FIG. 1.

Referring to FIG. 2, FIG. 9, and FIG. 10, the battery pack 200 further includes a battery management system 203. The battery management system 203 is located on a side of the first end cover 30 back away from the second end cover 40. The battery housing 100 further includes a protective cover 70. The protective cover 70 covers the battery management system 203. The first side cover 10 is provided with a second connecting hole 16. The first end cover 30 is provided with a via hole 33 aligned with the second connecting hole 16. The protective cover 70 is provided with a second mounting hole 71. A second fastener 302 runs through the second mounting hole 71 and the via hole 33 in sequence and is threadedly connected to the second connecting hole 16, so that the protective cover 70, the first end cover 30, and the first side cover 10 are relatively fastened. The second fastener 302 holds the protective cover 70 and the first end cover 30 on the first side cover 10, allowing the first end cover 30 and the first side cover 10 to be more firmly connected.

It can be understood that, in other embodiments, the protective cover 70 may alternatively be directly connected to the first end cover 30.

The first end cover 30 is provided with a stiffener 34 for improving strength. A mounting surface 321 on the peripheral side of the first mounting hole 32 for mounting the first fastener 301 is lower than a top surface 341 of the stiffener 34, avoiding interference between the first fastener 301 and the protective cover 70 and reducing a size of the battery housing 100 in the first direction X. The second end cover 40 is provided with a stiffener 44 for enhancing strength. A mounting surface 321 on the peripheral side of the first mounting hole 42 for mounting the first fastener 301 is lower than a top surface 441 of the stiffener 44, reducing a size of the battery housing 100 in the first direction X. It can be understood that, in other embodiments, the stiffener 34 and the stiffener 44 may alternatively be omitted.

Figure 7:
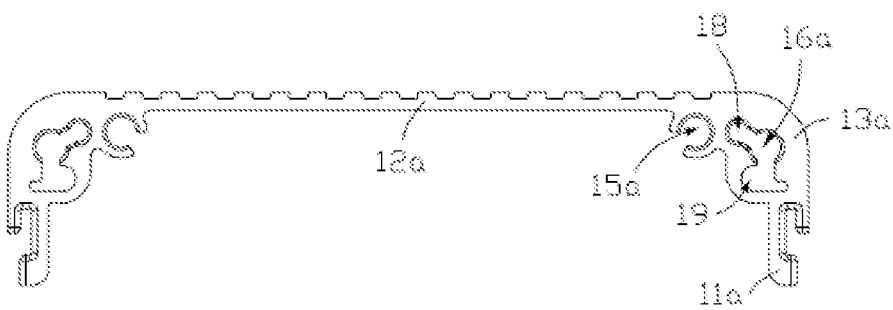
FIG. 7 is a schematic structural diagram of a first side cover of the battery housing shown in FIG. 1 according to another embodiment.

Referring to FIG. 7, in another embodiment, a structure of a first side cover 10a is substantially the same as that of the first side cover 10, except that the first side cover 10a is further provided with a groove 19 for weight reduction and a reserved third connecting hole 18, and that a first connecting hole 15a of the first side cover 10a is arranged at a joint between a protrusion 13a and a first body 12a. A second connecting hole 16a of the first side cover 10a, the third connecting hole 18, and the groove 19 are connected in sequence, and are arranged at the protrusion 13a. The first connecting hole 15a, the second connecting hole 16a, the third connecting hole 18, and the groove 19 respectively penetrate the first side cover 10a in the first direction X.

The protrusion 13a strengthens a weak structure, that is, strength of a joint between an abutting part 11a and the first body 12a of the first side cover 10a, so as to meet strength requirements of the first side cover 10a in working conditions such as vibration and shock in the course of falling or transportation; and the part of the protrusion 13*a* is removed from the groove 19 to reduce overall weight of the first side cover 10*a* and optimize the structure of the first side cover 10*a*.

The first connecting hole 15*a*, the second connecting hole 16*a*, the third connecting hole 18, and the groove 19 respectively penetrate the first side cover 10*a* in the first direction X, further reducing the weight of the first side cover 10*a*.

In other embodiments, when the structure of the first end cover 30 is a sheet metal part, another fastener (not shown in the figure) is used to threadly connect to the reserved third connecting hole 18, so that the first end cover 30 is fastened to the first side cover 10. A hole diameter of the third connecting hole 18 is not greater than that of the first connecting hole 15*a*, so that a height of the fastener, connected to the third connecting hole 18, protruding from the first end cover 30 is not greater than that of the first fastener 301.

The first end cover 30 is provided with a first through hole 35. A partitioning part 351 is provided in the first through hole 35. The partitioning part 351 partitions the first through hole 35 into a first hole 353 and a second hole 355 that are separated. The first hole 353 and the second hole 355 each allow a plurality of wiring harnesses (not shown in the figure) of the battery cell module 201 and the battery management system 203 to pass through, for distribution of wiring harnesses. For example, strong-current wiring harnesses pass through the first hole 353, and weak-current wiring harnesses pass through the second hole 355, thereby reducing interference between the plurality of wiring harnesses. For another example, wiring harnesses connected to a positive electrode pass through the first hole 353, and wiring harnesses connected to a negative electrode pass through the second hole 355. The use of the partitioning part 351 increases a safety distance between the wiring harnesses in the first hole 353 and the second hole 355 and reduces a risk of short circuit.

The first end cover 30 and the second end cover 40 are respectively made by a die-casting process, but are not limited thereto. A plurality of threaded holes 36 and a plurality of unthreaded holes 37 are symmetrically provided in the first end cover 30 at a plurality of different positions. The threaded holes 36 are configured for installing the battery management system 203. The threaded holes 36 or the unthreaded holes 37 are configured for connecting a cable tie or the like.

The second end cover 40 is provided with a plurality of second through holes 45. A heat dissipation structure 205 is installed on a side of the first end cover 30 back away from the second end cover 40. The first through hole 35 and the second through hole 45 allow gas to pass through. The second through hole 45 and the heat dissipation structure 205 are respectively located at two ends of a diagonal line of the battery cell module 201. The heat dissipation structure 205 is a fan, but is not limited to this. A cold air flow from the heat dissipation structure 205 enters the interior of the battery housing 100 through the first through hole 35 and moves from the first end cover 30 to the second end cover 40, where the shortest path for the cold air flow is the diagonal line of the battery cell module 201, allowing the cold air flow to flow through a position generating much heat in the central region of the battery cell module 201, and achieving a good heat dissipation effect for the battery cell module 201.

The battery management system 203 is provided with a plurality of electronic components. The electronic components include a power button 2031, an input/output port 2032, a battery indicator module 2033, an alarm module 2034, and the like. The protective cover 70 is a shell structure. A panel 72 is provided on a side of the protective cover 70 back away from the first end cover 30. The panel 72 is provided with a plurality of third mounting holes 721. The plurality of third mounting holes 721 correspond to and expose a plurality of electronic components. The panel 72 is lower than the outermost side of the protective cover 70 farther away from the first end cover 30 to protect the plurality of electronic components of the battery management system 203. The panel 72 is not lower than the outermost side of the power button back away from the first end cover 30 to avoid accidentally touching the power button 2031.

The battery management system 203 is covered with an insulating film 207, so as to be insulated from an inner wall of the protective cover 70.

The protective cover 70 is provided with a handle 73 for portability. The protective cover 70 is formed with the handle 73 as a whole through die-casting, so as to enhance overall strength of the protective cover 70, and implement reliable moving of the battery housing 100 by using the handle 73. It can be understood that, in other embodiments, the handle 73 may alternatively be omitted.

The battery housing 100 further includes lugs 80. The lugs 80 are respectively arranged at the two ends of the first end cover 30 and are configured for installing the battery housing 100 on an external mechanism.

During installation, the cushion 50 is placed between the battery cell module 201 and the first end cover 30, and the wiring harnesses of the battery cell module 201 pass through the first through hole 35 of the first end cover 30; the two first side covers 10 are respectively arranged at the two sides of the battery cell module 201 and both connected to the first end cover 30; the abutting parts 11 of the two first side covers 10 abut on and fasten the battery cell module 201; the two second side covers 20 slide along the sliding grooves 14 of the two first side covers 10 respectively, so that the two second side covers 20 are respectively arranged at the two sides of the battery cell module 201; the cushion 60 is arranged at a side of the battery cell module 201 back away from the cushion 50, and the second end cover 40 is installed on the first side cover 10, so that the first end cover 30 and the second end cover 40 apply pressure to the cushion 50, the cushion 60, and the battery cell module 201; the battery management system 203 and the heat dissipation structure 205 are installed on the first end cover 30 and connected to the wiring harnesses; the battery management system 203 is covered with the insulating film 207; the protective cover 70 is installed on the first side cover 10 to cover the battery management system 203; and the lugs 80 are installed on the two ends of the first end cover 30 for connecting the battery pack 200 to an external mechanism.

In the foregoing battery housing and the battery, the first side cover is provided with the abutting part, the abutting part is inserted in the first groove of the battery cell module, and the two first side covers are connected through the enclosure cover, so that the abutting parts of the two first side covers respectively abut on the two opposite sides of the battery cell module, to fasten the battery cell module in the battery housing. This allows for convenient and efficient installation.

The foregoing embodiments are merely intended to describe the technical solutions of this application, but not intended to constitute any limitation. Although this application is described in detail with reference to preferred embodiments, persons of ordinary skill in the art should understand that modifications or equivalent replacements can be made to the technical solutions of this application, without departing from the spirit and essence of the technical solutions of this application.

We claim:

1. A battery pack, comprising:

a battery cell module comprising a plurality of battery cells stacked in a first direction, wherein a first groove extending in the first direction is formed at each of two ends of a first side of the battery cell module, the first groove having both a first groove wall and a second groove wall;

two first side covers, wherein in a second direction, the two first side covers are arranged at two opposite sides of the battery cell module; and first bodies of the two first side covers are substantially parallel to a third direction of the battery cell module, each of the first side covers is provided with an abutting part having both a first abutting surface and a second abutting surface, the first abutting surface butts up against the first groove wall, and the second abutting surface butts up against the second groove wall, the abutting part extends from an edge of the first side cover and is substantially perpendicular to the first body of the first side cover, the second direction is perpendicular to the third direction, and the first direction is perpendicular to both the second direction and the third direction;

two second side covers, wherein in the third direction, the two second side covers are arranged at two opposite sides of the battery cell module, the two second side covers are substantially parallel to the second direction, and the two second side covers and the two first side covers are fastened to each other a first end cover and a second end cover, wherein the first end cover and the second end cover are respectively located on two opposite sides of the battery cell module and both connected to the two second side covers, wherein the second side cover comprises a second body and sliding parts respectively arranged at two ends of the second body; and the first side cover is provided with sliding grooves penetrating two ends of the first side cover, the two sliding parts respectively slide into the sliding grooves on the two first side covers, and movement of the sliding part in a plane perpendicular to a sliding direction is stopped by the groove walls of the sliding groove.

2. The battery pack according to claim 1, wherein the battery cell module comprises a plurality of battery cell frames for accommodating the plurality of battery cells.

3. The battery pack according to claim 2, wherein the first abutting surface intersects with the second abutting surface.

4. The battery pack according to claim 3, wherein a protrusion protruding toward the battery cell module is provided at intersection of the abutting part and the first body.

5. The battery pack according to claim 4, wherein the protrusion is provided with a groove for weight reduction.

6. The battery pack according to claim 1, further comprising at least two cushions, wherein at least one of the cushions is located between the first end cover and the battery cell module, and the first end cover is connected to the first side cover and presses the cushion onto the battery cell module; and at least one of the cushions is located between the second end cover and the battery cell module, and the second end cover is connected to the first side cover and presses the cushion onto the battery cell module.

7. The battery pack according to claim 6, wherein the first end cover is provided with a first butting surface for butting up against the cushion, the second end cover is provided with a second butting surface for butting up against the cushion, and a distance H between the first butting surface and the second butting surface satisfies: $H=h-\varepsilon_1-\varepsilon_2$, wherein h is a sum of a height of the battery cell module and a total height of all the cushions located between the first end cover and the second end cover in natural state, and $\varepsilon_1$ is a total deformation of the plurality of battery cells in the battery cell module, obtained through life test; and the first end cover and the second end cover each apply pressure to the corresponding cushion in the stacking direction of the battery cells in the battery cell module, so that the cushions deform under the pressure, wherein $\varepsilon_2$ is a total deformation of all cushions between the first end cover and the second end cover, obtained through life test.

8. The battery pack according to claim 1, wherein the sliding groove comprises a first stop surface, a second stop surface, and a third stop surface that are sequentially connected, wherein the first stop surface and the third stop surface are respectively located on two opposite sides of the sliding part, and the second stop surface is located on a side of the sliding part back away from the second body.

9. The battery pack according to claim 8, wherein the sliding part comprises an adapting part and a positioning part, wherein one end of the adapting part is arranged at the second body, and the other end of the adapting part extends toward the second body; one end of the positioning part is arranged at the adapting part, and the other end of the positioning part extends toward a side of the adapting part back away from the second body; and movement of the positioning part is stopped by the first stop surface, the second stop surface and the third stop surface; and the sliding groove further comprises a fourth stop surface and a fifth stop surface connected to the fourth stop surface, wherein the fourth stop surface is opposite to the second stop surface and is configured to stop a side of the positioning part back away from the second stop surface, and the fifth stop surface is configured to stop the second body.

10. The battery pack according to claim 1, wherein the two opposite sides of a second body respectively butt up against the first end cover and the second end cover.

11. The battery pack according to claim 1, wherein the first side cover is provided with a first connecting hole, and the first end cover and the second end cover are each provided with a first mounting hole aligned with the connecting hole, and a first fastener runs through the first mounting hole and is threadedly connected to the first connecting hole, so that the first end cover and the second end cover are both connected and fastened to the first side cover.

12. The battery pack according to claim 11, wherein the first end cover and the second end cover are each provided with a stiffener for increasing strength, wherein a mounting surface, on a peripheral side of the first mounting hole, for mounting the first fastener is lower than a top surface of the stiffener.

13. The battery pack according to claim 1, further comprising a protective cover, wherein a side of the first end cover back away from the second end cover is used for installing a battery management system, the protective cover covers the battery management system, the first side cover is provided with a second connecting hole, the first end cover is provided with a via hole aligned with the second connecting hole, the protective cover is provided with a second mounting hole, and a second fastener runs through the second mounting hole and the via hole in sequence and is threadedly connected to the second connecting hole, so that the protective cover, the first end cover, and the first side cover are relatively fastened.

14. The battery pack according to claim 13, wherein the first end cover is provided with a first through hole, a partitioning part is provided in the first through hole, the partitioning part partitions the first through hole into a first hole and a second hole, and the first hole and the second hole each allow a plurality of wiring harnesses of the battery cell module and the battery management system to pass through, for distribution of wiring harnesses.

15. The battery pack according to claim 14, wherein a plurality of threaded holes and a plurality of unthreaded holes are symmetrically arranged in the first end cover at a plurality of different positions, wherein the threaded hole is used to install the battery management system, and the unthreaded hole is used to fasten the wired wiring harness.

16. The battery pack according to claim 13, wherein a plurality of electronic components are provided in the battery management system, a panel is provided on a side of the protective cover back away from the first end cover, the panel is configured for installing the plurality of electronic components, and the panel is lower than the outermost side of the protective cover farther away from the first end cover.

17. The battery pack according to claim 16, wherein the electronic components comprise a power button, and the panel is not lower than the outermost side of the power button back away from the first end cover.

18. The battery pack according to claim 13, wherein the protective cover is provided with a handle for portability, and the protective cover is formed with the handle as a whole through die-casting.

* * * * *